(12) United States Patent
Jung et al.

(10) Patent No.: US 8,077,928 B2
(45) Date of Patent: Dec. 13, 2011

(54) IMAGE MAPPING TO PROVIDE VISUAL GEOGRAPHIC PATH

(75) Inventors: Edward K. Y. Jung, Bellevue, WA (US);
Royce A. Levien, Lexington, MA (US);
Robert W. Lord, Seattle, WA (US);
Mark A. Malamud, Seattle, WA (US);
John D. Rinaldo, Jr., Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 0 days.

(21) Appl. No.: 12/804,021

(22) Filed: Jul. 12, 2010

(65) Prior Publication Data

US 2011/0044511 A1 Feb. 24, 2011

Related U.S. Application Data

(63) Continuation of application No. 11/066,112, filed on Feb. 25, 2005, now Pat. No. 7,756,300.

(51) Int. Cl.
*G06K 9/00* (2006.01)
*G09G 5/00* (2006.01)
(52) U.S. Cl. .......................... 382/113; 382/284; 345/619
(58) Field of Classification Search .................. 382/100, 382/103, 104, 106, 113, 114, 155, 168, 180, 382/181, 184, 189, 216, 232, 255, 274, 276, 382/291, 305, 284; 707/101, 209, 200, 201; 379/201.03; 345/8, 619
See application file for complete search history.

(56) References Cited

U.S. PATENT DOCUMENTS

| | | | |
|---|---|---|---|
| 4,301,506 A | 11/1981 | Turco | |
| 4,528,552 A | 7/1985 | Moriyama et al. | |
| 4,546,439 A | 10/1985 | Esparza | |
| 4,570,227 A | 2/1986 | Tachi et al. | |
| 4,646,089 A | 2/1987 | Takanabe et al. | |
| 4,734,863 A | 3/1988 | Honey et al. | |
| 4,764,873 A | 8/1988 | Libby | |
| 4,796,189 A | 1/1989 | Nakayama et al. | |
| 4,866,626 A | 9/1989 | Egli | |
| 4,876,651 A | 10/1989 | Dawson et al. | |
| 4,890,104 A | 12/1989 | Takanabe et al. | |
| 4,914,605 A | 4/1990 | Loughmiller et al. | |
| 4,926,336 A | 5/1990 | Yamada | |
| 4,937,753 A | 6/1990 | Yamada | |
| 4,954,958 A | 9/1990 | Savage et al. | |
| 4,962,458 A | 10/1990 | Verstraete | |
| 4,984,168 A | 1/1991 | Neukrichner et al. | |
| 5,031,104 A | 7/1991 | Ikeda et al. | |
| 5,041,983 A | 8/1991 | Nakahara et al. | |
| 5,067,081 A | 11/1991 | Person | |
| 5,115,399 A | 5/1992 | Nimura et al. | |
| 5,168,452 A | 12/1992 | Yamada et al. | |
| 5,170,353 A | 12/1992 | Verstraete | |

(Continued)

OTHER PUBLICATIONS

U.S. Appl. No. 11/124,626, Jung et al.

(Continued)

*Primary Examiner* — Seyed Azarian

(57) ABSTRACT

Provided is a computer system and method for mapping a visual path. The method includes receiving one or more images included in a predefined area; receiving one or more parameters associated with the image; and integrating the images and parameters into a map of the predefined area to enable mapping the visual path through the predefined area in response to one or more input path parameters.

7 Claims, 3 Drawing Sheets

U.S. PATENT DOCUMENTS

| | | | |
|---|---|---|---|
| 5,172,321 | A | 12/1992 | Ghaem et al. |
| 5,189,430 | A | 2/1993 | Yano et al. |
| 5,191,406 | A | 3/1993 | Brandestini et al. |
| 5,191,532 | A | 3/1993 | Moroto et al. |
| 5,231,584 | A | 7/1993 | Nimura et al. |
| 5,270,937 | A | 12/1993 | Link et al. |
| 5,274,387 | A | 12/1993 | Kakihara et al. |
| 5,293,163 | A | 3/1994 | Kakihara et al. |
| 5,802,526 | A | 9/1998 | Fawcett et al. |
| 5,844,570 | A | 12/1998 | Curtright et al. |
| 5,848,373 | A * | 12/1998 | DeLorme et al. ............. 701/200 |
| 5,884,262 | A | 3/1999 | Wise et al. |
| 5,948,040 | A | 9/1999 | DeLorme et al. |
| 6,009,403 | A | 12/1999 | Sato |
| 6,084,882 | A | 7/2000 | Ogura et al. |
| 6,104,790 | A | 8/2000 | Naravanaswami |
| 6,119,095 | A | 9/2000 | Morita |
| 6,240,360 | B1 | 5/2001 | Phelan |
| 6,282,489 | B1 | 8/2001 | Bellesfield et al. |
| 6,321,158 | B1 * | 11/2001 | DeLorme et al. ............. 701/201 |
| 6,347,299 | B1 | 2/2002 | Holzman et al. |
| 6,381,534 | B2 | 4/2002 | Takayama et al. |
| 6,493,428 | B1 | 12/2002 | Hillier |
| 6,496,842 | B1 | 12/2002 | Lyness |
| 6,498,982 | B2 | 12/2002 | Bellesfield et al. |
| 6,542,593 | B1 * | 4/2003 | Bowman-Amuah ..... 379/201.03 |
| 6,553,309 | B2 | 4/2003 | Uchida et al. |
| 6,570,595 | B2 | 5/2003 | Porter |
| 6,636,803 | B1 | 10/2003 | Hartz, Jr. et al. |
| 6,680,999 | B1 | 1/2004 | Garcia |
| 6,718,017 | B1 | 4/2004 | Price et al. |
| 6,728,731 | B2 | 4/2004 | Sarukkai et al. |
| 6,731,625 | B1 | 5/2004 | Eastep et al. |
| 6,751,626 | B2 * | 6/2004 | Brown et al. .................... 1/1 |
| 6,801,604 | B2 | 10/2004 | Maes et al. |
| 6,816,779 | B2 | 11/2004 | Chen et al. |
| 6,826,474 | B2 | 11/2004 | Miyahara et al. |
| 6,839,023 | B1 | 1/2005 | Benco et al. |
| 6,862,524 | B1 * | 3/2005 | Nagda et al. .................. 701/209 |
| 6,868,333 | B2 | 3/2005 | Melen |
| 7,058,507 | B2 | 6/2006 | Saiki |
| 7,103,472 | B2 * | 9/2006 | Itabashi ................. 701/200 |
| 7,148,861 | B2 * | 12/2006 | Yelton et al. ..................... 345/8 |
| 7,236,173 | B2 | 6/2007 | Chithambaram et al. |
| 7,292,935 | B2 | 11/2007 | Yoon |
| 2002/0174003 | A1 | 11/2002 | Redmann et al. |
| 2003/0134648 | A1 | 7/2003 | Reed et al. |
| 2004/0015293 | A1 | 1/2004 | Randazzo et al. |
| 2004/0054428 | A1 | 3/2004 | Sheha et al. |
| 2004/0172192 | A1 | 9/2004 | Knutson |
| 2004/0193707 | A1 | 9/2004 | Alam et al. |
| 2004/0217884 | A1 | 11/2004 | Samadani et al. |
| 2004/0224703 | A1 | 11/2004 | Takaki et al. |
| 2004/0254723 | A1 | 12/2004 | Tu |
| 2005/0032556 | A1 | 2/2005 | Bennett et al. |
| 2005/0072116 | A1 | 4/2005 | Bunte |
| 2005/0102099 | A1 | 5/2005 | Linn |
| 2005/0102245 | A1 | 5/2005 | Edlund et al. |
| 2005/0131643 | A1 | 6/2005 | Shaffer et al. |
| 2006/0040670 | A1 | 2/2006 | Li et al. |
| 2006/0058948 | A1 | 3/2006 | Blass et al. |
| 2006/0168592 | A1 | 7/2006 | Andrews et al. |

OTHER PUBLICATIONS

U.S. Appl. No. 11/047,465, Jung et al.
U.S. Appl. No. 11/058,399, Jung et al.
U.S. Appl. No. 11/050,642, Jung et al.
U.S. Appl. No. 11/086,973, Jung et al.
U.S. Appl. No. 11/998,450, Jung et al.
U.S. Appl. No. 11/998,827, Jung et al.
U.S. Appl. No. 11/998,871, Jung et al.
U.S. Appl. No. 12/231,314, Jung et al.
U.S. Appl. No. 12/231,325, Jung et al.
Bobrich, Joachim, et al., "Augmented Maps"; Symposium on Geospatial Theory, Processing and Applications; 2002; pp. 1-4; Ottowa, Canada.
Espatial: iSMART Overview; located at www.espatial.com-page455.html; bearing a date of Feb. 8, 2005; pp. 1-3.
Gluck, Myke, Ph.D., et al., "Augmented Seriation: Usability of a Visual and Auditory Tool for Geographic Pattern Discovery with Risk Perception Data"; GeoComputation, 1999; pp. 1-11.
Hall, T. Brett et al., "A Novel Interactivity Environment for Integrated Intelligent Transportation and Telematic Systems"; 5th Intl. IEEE Conf.; Singapore; Sep. 3-6, 2002; pp. 2-8.
Introduction to Augmented Reality; located at: http://www.se.rit.edu~jrv/research/ar/introction.html; pp. 1-11; printed Dec. 15, 2004.
Lowe, Jonathan W.; "Raster-Oriented Technology Supports Public Internet Applications That Manage Larger Raster Collections"; Net Results—Geospatial Solutions; Oct. 2004; pp. 1-4; Advanstar Communications Inc.
Seattle Area Traffic Home, web page; Dec. 20, 2004; 11:14 A.M.; www.wsdot.wa.gov-traffic-seattle.
Wei, Li-Yi and LeVoy, Marc; "Fast Texture Synthesis Tree-Structured Vector Quantization"; Stanford University; bearing a fax date of Jun. 3, 2005; pp. 1-10.
Zhong, David X.; "Color Space Analysis and Color Image Segmentation"; School of Electrical and Information Engineering; The University of Sydney; bearing a fax date of Jun. 3, 2005; pp. 1-5.

* cited by examiner

IMAGE MAPPING TO PROVIDE VISUAL GEOGRAPHIC PATH

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

Related Applications:

For purposes of the USPTO extra-statutory requirements, the present application constitutes a continuation of U.S. patent application Ser. No. 11/066,112, entitled IMAGE MAPPING TO PROVIDE VISUAL GEOGRAPHIC PATH, naming Edward K.Y. Jung, Royce A. Levien, Robert W. Lord, Mark A. Malamud, and John D. Rinaldo, Jr. as inventors, filed Feb. 25, 2005 now U.S. Pat. No. 7,756,300, which application is currently co-pending, or is an application of which a currently co-pending application is entitled to the benefit of the filing date.

TECHNICAL FIELD

The present application relates generally to maps.

SUMMARY

In one aspect, a method includes but is not limited to receiving one or more images of a predefined area; receiving one or more parameters associated with the one or more images; integrating the one or more images and the one or more parameters into a map of the predefined area; and mapping the visual path through the predefined area in response to one or more input path parameters In addition to the foregoing, other method aspects are described in the claims, drawings, and text forming a part of the present application.

In one aspect, a method for a display device to receive a mapped visual path includes, but is not limited to transmitting a request for the mapped visual path, the request including one or more input path parameters associated with the mapped visual path; and receiving from a processing device a mapped visual path, the mapped visual path including one or more images of a predefined area identified by the one or more input path parameters, the mapped visual path being an integration of the one or more images and the one or more input path parameters.

In another aspect, a computer program product can include signal bearing medium bearing one or more instructions including, but not limited to one or more instructions for receiving one or more images of a predefined area; receiving one or more parameters associated with the one or more images; and integrating the one or more images and the one or more parameters into a map of the predefined area; and one or more instructions for mapping the visual path through the predefined area in response to one or more input path parameters.

In another aspect, a computer program product can include signal bearing medium bearing one or more instructions including, but not limited to one or more instructions for transmitting a request for the mapped visual path, the request including one or more input path parameters associated with the mapped visual path; and one or more instructions for receiving from a processing device a mapped visual path, the mapped visual path including one or more images of a predefined area identified by the one or more input path parameters, the mapped visual path being an integration of the one or more images and the one or more input path parameters.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

In one aspect, a system includes but is not limited to a processor; a memory coupled to the processor; an image module coupled to the memory, the image module including: a data store configurable to hold one or more images of a predefined area; and an integration module configurable to integrate the images and generate a visual path through the predefined area in response to a query. In addition to the foregoing, other system aspects are described in the claims, drawings, and text forming a part of the present application.

In addition to the foregoing, various other method and/or system aspects are set forth and described in the text (e.g., claims and/or detailed description) and/or drawings of the present application.

The foregoing is a summary and thus contains, by necessity, simplifications, generalizations and omissions of detail; consequently, those skilled in the art will appreciate that the summary is illustrative only and is NOT intended to be in any way limiting. Other aspects, features, and advantages of the devices and/or processes and/or other subject described herein will become apparent in the text set forth herein.

BRIEF DESCRIPTION OF THE DRAWINGS

A better understanding of the subject matter of the application can be obtained when the following detailed description of the disclosed embodiments is considered in conjunction with the following drawings, in which.

DETAILED DESCRIPTION OF THE DRAWINGS

Those with skill in the computing arts will recognize that the disclosed embodiments have relevance to a wide variety of applications and architectures in addition to those described below. In addition, the functionality of the subject matter of the present application can be implemented in software, hardware, or a combination of software and hardware. The hardware portion can be implemented using specialized logic; the software portion can be stored in a memory or recording medium and executed by a suitable instruction execution system such as a microprocessor.

Figure 1:
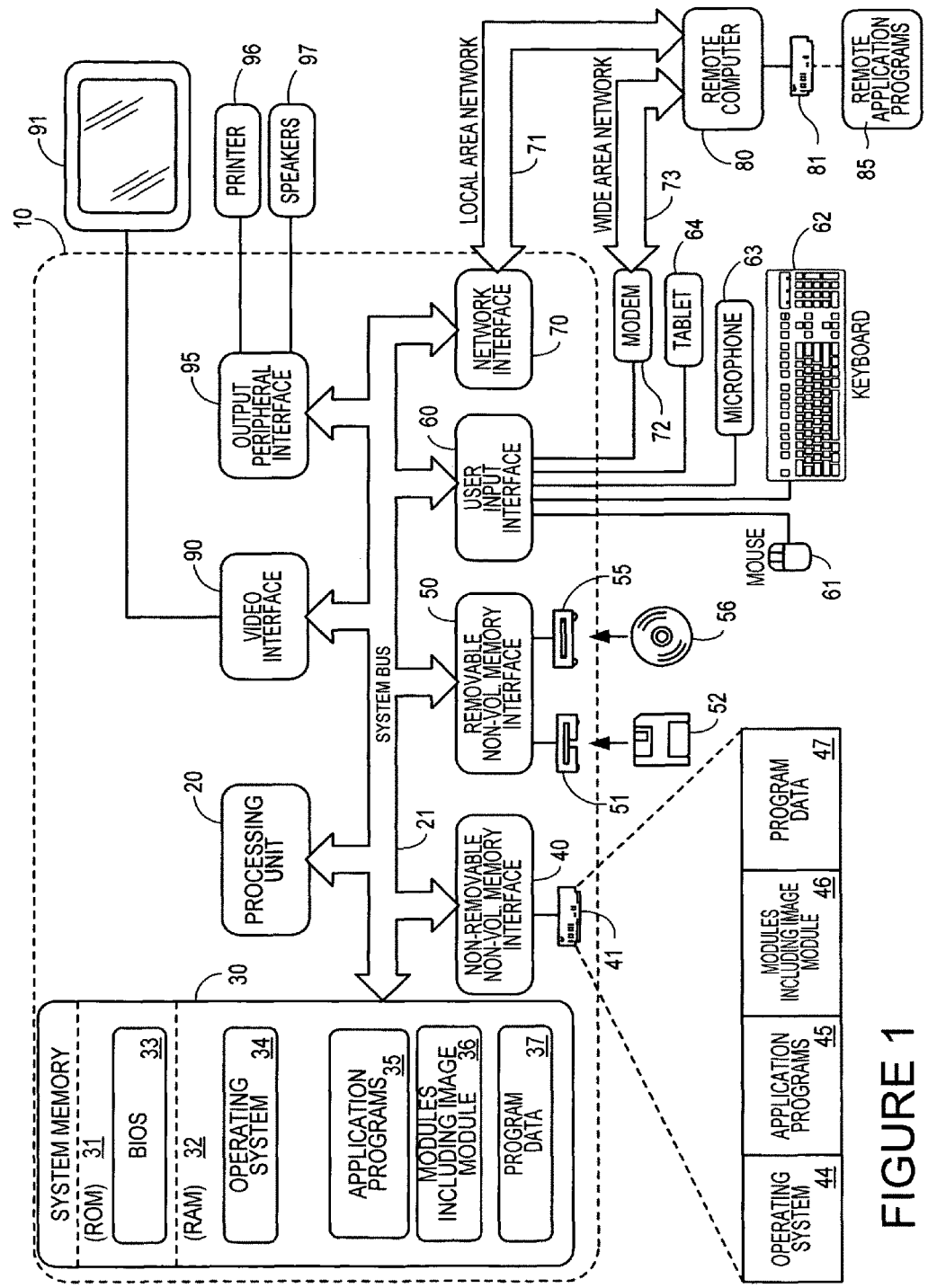
FIG. 1 is a block diagram of an exemplary computer architecture that supports the claimed subject matter.

With reference to FIG. 1, an exemplary computing system for implementing the embodiments and includes a general purpose computing device in the form of a computer 10. Components of the computer 10 may include, but are not limited to, a processing unit 20, a system memory 30, and a system bus 21 that couples various system components including the system memory to the processing unit 20. The system bus 21 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 10 typically includes a variety of computer readable media. Computer readable media can be any available media that can be accessed by the computer 10 and includes both volatile and nonvolatile media, and removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 10. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 30 includes computer storage media in the form of volatile and/or nonvolatile memory such as read only memory (ROM) 31 and random access memory (RAM) 32. A basic input/output system 33 (BIOS), containing the basic routines that help to transfer information between elements within computer 10, such as during start-up, is typically stored in ROM 31. RAM 32 typically contains data and/or program modules that are immediately accessible to and/or presently being operated on by processing unit 20. By way of example, and not limitation, FIG. 1 illustrates operating system 34, application programs 35, other program modules 36 and program data 37. FIG. 1 is shown with program modules 36 including a queuing module in accordance with an embodiment as described herein.

The computer 10 may also include other removable/non-removable, volatile/nonvolatile computer storage media. By way of example only, FIG. 1 illustrates a hard disk drive 41 that reads from or writes to non-removable, nonvolatile magnetic media, a magnetic disk drive 51 that reads from or writes to a removable, nonvolatile magnetic disk 52, and an optical disk drive 55 that reads from or writes to a removable, nonvolatile optical disk 56 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 41 is typically connected to the system bus 21 through a non-removable memory interface such as interface 40, and magnetic disk drive 51 and optical disk drive 55 are typically connected to the system bus 21 by a removable memory interface, such as interface 50.

The drives and their associated computer storage media, discussed above and illustrated in FIG. 1, provide storage of computer readable instructions, data structures, program modules and other data for the computer 10. In FIG. 1, for example, hard disk drive 41 is illustrated as storing operating system 44, application programs 45, other program modules 46 and program data 47. Program modules 46 is shown including an image module, which can be configured as either located in modules 36 or 46, or both locations, as one with skill in the art will appreciate. Note that these components can either be the same as or different from operating system 34, application programs 35, other program modules 36, and program data 37. Operating system 44, application programs 45, other program modules 46, and program data 47 are given different numbers hereto illustrate that, at a minimum, they are different copies. A user may enter commands and information into the computer 10 through input devices such as a tablet, or electronic digitizer, 64, a microphone 63, a keyboard 62 and pointing device 61, commonly referred to as a mouse, trackball or touch pad. Other input devices (not shown) may include a joystick, game pad, satellite dish, scanner, or the like. These and other input devices are often connected to the processing unit 20 through a user input interface 60 that is coupled to the system bus, but may be connected by other interface and bus structures, such as a parallel port, game port or a universal serial bus (USB). A monitor 91 or other type of display device is also connected to the system bus 21 via an interface, such as a video interface 90. The monitor 91 may also be integrated with a touch-screen panel or the like. Note that the monitor and/or touch screen panel can be physically coupled to a housing in which the computing device 10 is incorporated, such as in a tablet-type personal computer. In addition, computers such as the computing device 10 may also include other peripheral output devices such as speakers 97 and printer 96, which may be connected through an output peripheral interface 95 or the like. A display device, for purposes of this patent application can include an e-paper display, a liquid crystal display and the like.

The computer 10 may operate in a networked environment using logical connections to one or more remote computers, such as a remote computer 80. The remote computer 80 may be a personal computer, a server, a router, a network PC, a peer device or other common network node, and typically includes many or all of the elements described above relative to the computer 10, although only a memory storage device 81 has been illustrated in FIG. 1. The logical connections depicted in FIG. 1 include a local area network (LAN) 71 and a wide area network (WAN) 73, but may also include other networks. Such networking environments are commonplace in offices, enterprise-wide computer networks, intranets and the Internet. For example, in the subject matter of the present application, the computer system 10 may comprise the source machine from which data is being migrated, and the remote computer 80 may comprise the destination machine. Note however that source and destination machines need not be connected by a network or any other means, but instead, data may be migrated via any media capable of being written by the source platform and read by the destination platform or platforms.

When used in a LAN or WLAN networking environment, the computer 10 is connected to the LAN through a network interface or adapter 70. When used in a WAN networking environment, the computer 10 typically includes a modem 72 or other means for establishing communications over the WAN 73, such as the Internet. The modem 72, which may be internal or external, may be connected to the system bus 21 via the user input interface 60 or other appropriate mechanism. In a networked environment, program modules depicted relative to the computer 10, or portions thereof, may be stored in the remote memory storage device. By way of example, and not limitation, FIG. 1 illustrates remote application programs 85 as residing on memory device 81. It will be appreciated that the network connections shown are exemplary and other means of establishing a communications link between the computers may be used.

In the description that follows, the subject matter of the application will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer which reconfigures or otherwise alters the operation of the computer in a manner well understood by those skilled in the art. The data structures where data is maintained are physical locations of the memory that have particular properties defined by the format of the data. However, although the subject matter of the application is being described in the foregoing context, it is not meant to be limiting as those of skill in the art will appreciate that some of the acts and operation described hereinafter can also be implemented in hardware.

Figure 2:
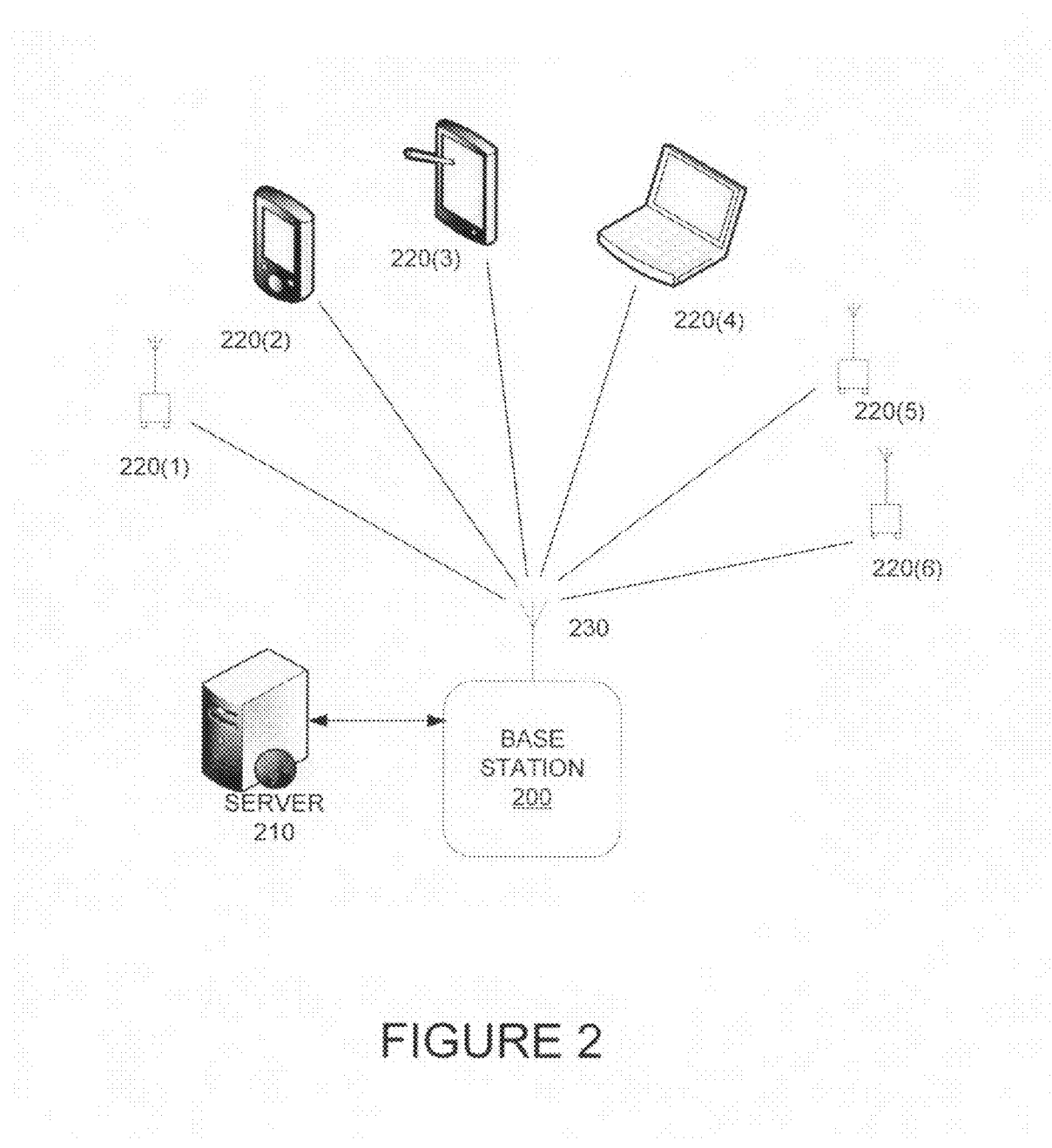
FIG. 2 is a block diagram of a wireless computer environment appropriate for embodiments of the subject matter of the present application.

Referring to FIG. 2, a diagram of a wireless network appropriate for some embodiments herein is shown. The wireless network includes a base station 200, which can be coupled to a server 210. Base station 200 interacts with a plurality of wireless components 220, which can be receivers only, designed to receive real time images and associated data as correlated and transmitted by server 210. Components interact with base station 200 via wireless connection 230. The wireless connection 230 could include a Global Positioning System (GPS), radio-frequency (RF) methods, or wireless local area network (WLAN). Another type of wireless connection could be a tracking tag system. Tracking tags typically communicate with a base station, each tag transmitting a unique code to identify an item to which it is attached. WLANs operate by connecting mobile devices to a base station and using signal strength sensing to determine a location of a mobile device. Other wireless connections appropriate for embodiments include satellite connections; IEEE 802.11 connections or Bluetooth-type connections or the like as one of skill in the art with the benefit of the present disclosure will appreciate.

Components 220 can include receivers and transmitters to interact with server 210. Components 220 are shown including different types of components, including components 220(1) which could be a simple device capable of only receiving and displaying data and images. The data could include written directions, a map, and images or the like. Component 220(2) is shown as a personal electronic assistant, which could be configured to both send and/or receive data, display maps and/or directions as generated by server 210. Component 220(3) is shown as a tablet personal computer (PC) which can also be configured to both send and/or receive data. Component 220(4) is shown as a laptop or notebook computer which can also send and/or receive data and/or directions. Components 220(5) could be implemented as a simple mobile device which could be configured to receive and display images that could be in real time. Component 220(6) could be implemented as a cellular telephone or pager and include a display configured to show a map and images in accordance with embodiments herein.

In an alternative embodiment, components 220 could be devices that are not coupled to a wireless network of any kind. Rather, in the embodiment, a component 220 could be configured to receive data and store data internally for later mobile use.

Figure 3:
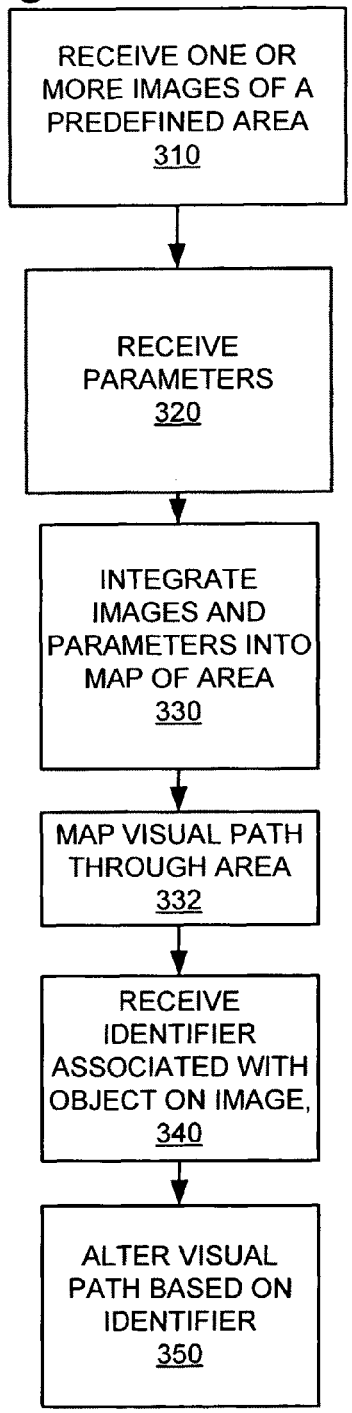
FIG. 3 is a flow diagram illustrating a method in accordance with an embodiment of the subject matter of the present application.

Referring now to FIG. 3, a flow diagram illustrates a method in accordance with an embodiment, in which the components wirelessly connected to the base station 200 and server 210 are coupled to receive images of an area. More particularly, the embodiment is directed to mapping a visual path. Block 310 provides for receiving one or more images included in a predefined area. The predefined area could be an amusement park, a city, or other area that a user of a mobile device could benefit from a visual path. The receiving the images could be from connecting to a server coupled to a mobile device such as a corn wirelessly receive the one or more images. Alternatively, the receiving the images could include a server receiving images from a stationary device, such as a device fixedly connected in a public area for collecting and sending images.

Block 320 provides for receiving one or more parameters associated with the image. For example, a visual path could be provided that provides images as needed by a mobile device user or a stationary device user. For example, a mobile device user may require a visual path to locate an item, person or place. A stationary device user may be monitoring a visual path taken by a person. A time parameter could be associated with the images to provide images as needed or according to user input. In one embodiment, the time parameter provides an interval for displaying or retrieving images for the visual path. The timing could take into account the speed at which a user walks and display images coordinate with where a user should be located.

In one embodiment, a GPS-type connection is used to locate a user and display a visual path taken by the user in near real time. The displayed images could then display an image collected in near real-time of the area where the user is located. In an embodiment, the GPS connection and the image of the user are periodically updated in response to input path parameters identifying the user, providing the periodicity for updating the images as a time parameter, and receiving a location parameter via the GPS connection to locate the user. Images of the user can be found via a public source of images of the area, such as images available over the internet. Also, if the user has images available to transmit, images can be collected directly from the user.

Block 330 provides for integrating the images and parameters into a map of the predefined area. The visual path can be through the predefined area in response to one or more input path parameters. The input path parameters could include locations, and locations in a specified order.

The integrating could include processing a stitched together display of images taken from public cameras, private cameras, and images available via the internet, in real time or not in real time. Thus, the visual path enables a user of a mobile device to visualize the path for travel purposes.

Block 332 provides for mapping a visual path through the predefined area in response to input path parameters.

The integrating can include, as shown by block 340, receiving an identifier associated with an object on one or more of the images. The identifier can be indicative of an action to be taken with respect to the object. Block 350 provides for altering the visual path based on the identifier. The action to be taken can include highlighting the object, removing the object or altering the object. If the object is a person, the person can be identified as related or unrelated to a class of persons. Thus, the altering could include deleting a class of persons or a person based on the identifier, or highlighting a class of persons, depending on the association with the identifier. For example, if a class of people are in a predefined area, on a trip or otherwise, and if a user of a device wants to track the people, highlighting would assist the user.

In one embodiment, the combined images could create a scrollable image path including real time images of the predefined area, the scrollable image path providing a virtual visual path through the predefined area. Such a scrollable visual path could assist a user trying to locate an address or location. Alternatively, the combining could include image stitching.

In one embodiment, the method shown in FIG. 3 is for a display device to receive a mapped visual path. More particularly, the method includes, but is not limited to transmitting a request for the mapped visual path that includes one or more input path parameters associated with the mapped visual path, and receiving from a processing device a mapped visual path, the mapped visual path including one or more images of a predefined area identified by the one or more input path parameters, the mapped visual path being an integration of the one or more images and the one or more input path parameters.

The display device can be either a mobile or fixed device configured to sequentially display the mapped visual path of the one or more images according to a time parameter. The transmitting a request for the mapped visual path can include transmitting one or more input path parameters associated with the mapped visual path such as a location parameter, a time parameter identifying a periodicity for the one or more images, and an identification of a user of the display device.

The receiving from a processing device a mapped visual path, the mapped visual path being an integration of the one or more images and the one or more input path parameters includes receiving the mapped visual path, the mapped visual path including an integration of an image history taken from one or more public cameras and/or one or more private cameras and the one or more input path parameters.

Referring back to FIG. 1, in one embodiment, a computer system includes a module, shown in FIG. 1 as modules 36 and 46. The image module is coupled to a computer system memory and processor. For purposes of the present application, an image module coupled to the memory can include but is not limited to an image module with all module components within the memory, an image module only partially coupled to the memory and partially coupled to other components such as to firmware, and a image module including only some components coupled to the memory and other components in another memory, such as RAM or ROM or a storage that can be manipulated.

In an embodiment, the image module is configured to receive one or more images included in a predefined area and integrate the images and generate a visual path through the predefined area in response to a query. The image module can be included with a mobile device or can be included as part of a server, such as server 210 that creates transmissions for the mobile device to display. If a server performs the processing, an embodiment includes a transmitter configured to transmit the visual path to the mobile device. The visual path can also be transmitted to a fixed device, such as a display device.

While the subject matter of the application has been shown and described with reference to particular embodiments thereof, it will be understood by those skilled in the art that the foregoing and other changes in form and detail may be made therein without departing from the spirit and scope of the subject matter of the application, including but not limited to additional, less or modified elements and/or additional, less or modified steps performed in the same or a different order.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

The herein described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of this subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

We claim:

1. A computer program product comprising:
a non-transitory computer readable medium bearing
one or more instructions for transmitting a request for the mapped visual path, the request including one or more input path parameters associated with the mapped visual path; and
one or more instructions for receiving from a processing device a mapped visual path, the mapped visual path including one or more images of a predefined area identified by the one or more input path parameters, the mapped visual path being an integration of the one or more images and the one or more input path parameters, the one or more images including an image history of the predefined area captured by a public camera in the predefined area;
one or more instructions for transmitting an identifier associated with an object on the one or more images, the identifier indicative of an action to be taken with respect to the object, wherein the object includes at least one person, the action including highlighting a location of the at least one person to enable tracking of the at least one person on the mapped visual path; and
one or more instructions for receiving from the processing device a periodically updated mapped visual path according to a time parameter and a location of a user of a mobile device in response to the mobile device transmitting the request for the mapped visual path.

2. The computer program product of claim 1 further comprising:
one or more instructions for sequentially displaying the mapped visual path of the one or more images according to a time parameter.

3. The computer program product of claim 1 wherein the one or more instructions for transmitting a request for the mapped visual path; the request including one or more input path parameters associated with the mapped visual path includes:
one or more instructions for transmitting a location parameter as one of the one or more input path parameters;
one or more instructions for transmitting a time parameter as one of the one or more input path parameters, the time parameter identifying a periodicity for the one or more images; and
one or more instructions for transmitting an identification of a user of the mobile device as one or the one or more input path parameters.

4. The computer program product of claim 1 wherein the one or more instructions for receiving from a processing device a mapped visual path, the mapped visual path including one or more images of a predefined area identified by the one or more input path parameters, the mapped visual path being an integration of the one or more images and the one or more input path parameters includes one or more instructions for receiving the mapped visual path, the mapped visual path including an integration of an image history taken from one or more public cameras and/or one or more private cameras and the one or more input path parameters.

5. The computer program product of claim 1 wherein the one or more instructions for receiving from a processing device a mapped visual path, the mapped visual path including one or more images of a predefined area identified by the one or more input path parameters, the mapped visual path being an integration of the one or more images and the one or more input path parameters includes:

one or more instructions for connecting to a server operably couplable to a mobile device to wirelessly receive the one or more images.

6. The computer program product of claim 1 wherein the one or more instructions for receiving from a processing device a mapped visual path, the mapped visual path including one or more images of a predefined area identified by the one or more input path parameters, the mapped visual path being an integration of the one or more images and the one or more input path parameters includes:

one or more instructions for displaying the mapped visual path, the mapped visual path including the one or more images after a stitching operation is performed on the one or more images.

7. The computer program product of claim 1 wherein the one or more instructions for receiving from a processing device a mapped visual path, the mapped visual path including one or more images of a predefined area identified by the one or more input path parameters, the mapped visual path being an integration of the one or more images and the one or more input path parameters includes:

one or more instructions for displaying the mapped visual path, the mapped visual path being scrollable with respect to the predefined area.

\* \* \* \* \*

UNITED STATES PATENT AND TRADEMARK OFFICE
CERTIFICATE OF CORRECTION

| | | |
|---|---|---|
| PATENT NO. | : 8,077,928 B2 | Page 1 of 1 |
| APPLICATION NO. | : 12/804021 | |
| DATED | : December 13, 2011 | |
| INVENTOR(S) | : Edward K. Y. Jung et al. | |

It is certified that error appears in the above-identified patent and that said Letters Patent is hereby corrected as shown below:

In the Claims

At claim 3, Column 10, row 52:

Delete "…mapped visual path;" and insert: --…mapped visual path,--

Signed and Sealed this
Fourth Day of June, 2013

Teresa Stanek Rea
*Acting Director of the United States Patent and Trademark Office*